Jan. 3, 1950 W. C. EDDY 2,493,238
KALEIDOSCOPIC IMAGE PROJECTOR WITH MASKING DEVICE
Filed Oct. 3, 1945
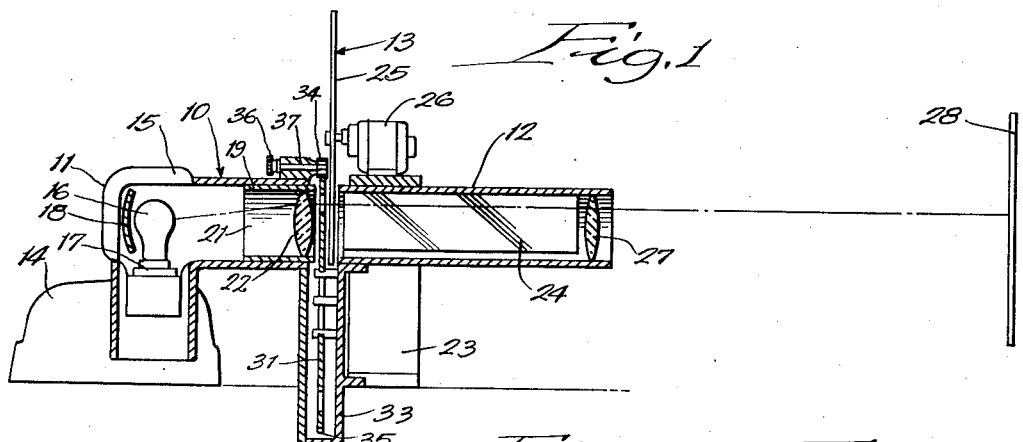
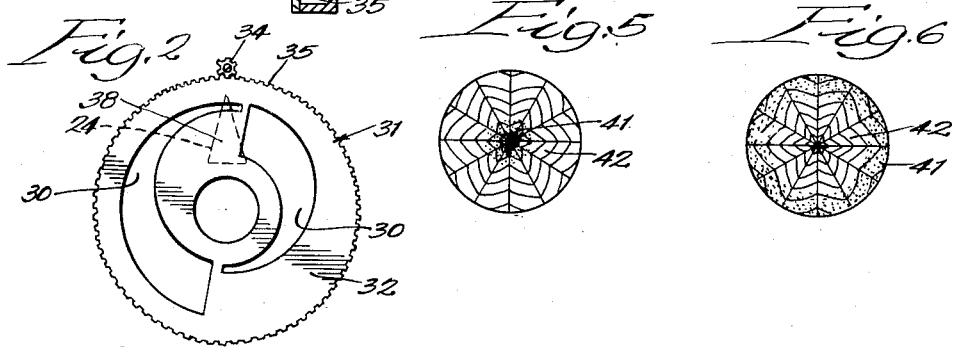
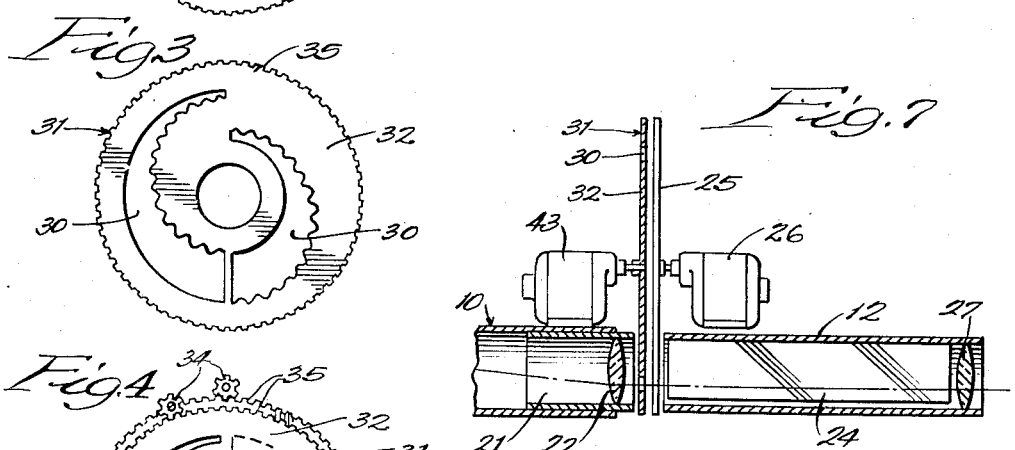
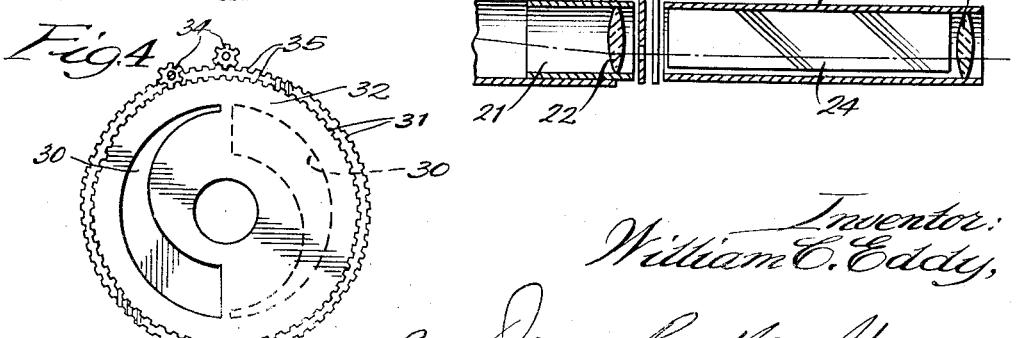
Inventor:
William C. Eddy Patented Jan. 3, 1950

2,493,238

UNITED STATES PATENT OFFICE 2,493,238

KALEIDOSCOPIC IMAGE PROJECTOR WITH MASKING DEVICE

William C. Eddy, Michigan City, Ind., assignor to Television Associates, Inc., Chicago, Ill., a corporation of Illinois Application October 3, 1945, Serial No. 619,965

4 Claims. (Cl. 88—24)

1

The invention relates to a masking device, and more particularly to a masking device for a projection apparatus such as that used for projecting kaleidoscopic images on a screen.

The masking device provided by the invention permits an image projected on a screen to be masked out completely or to be partially masked or darkened in a variety of pleasing designs. The masking out effect may be provided at desired intervals and may be coordinated with the projection device and with the film being projected. Where used with a kaleidoscopic projector, the masking device may be used to complement the images projected by causing darkened areas on the screen of the same general pattern as the images themselves.

It is an object of the invention to provide a masking device for a projection apparatus in which selected portions of the images produced by the apparatus may be masked out.

It is also an object of the invention to provide a masking device for use with a kaleidoscopic projection apparatus by which the masking effect can be made to originate either from the periphery or the center of the image. According to one feature the masking may be progressive so that the entire image can be progressively obliterated or reinstated.

It is a further object of the invention to provide a masking device for a projection apparatus that produces fixed or moving darkened areas on a screen of pleasing and fanciful design.

A further object of the invention is the provision of a masking device for a projection apparatus to produce a darkened area on the image on which a second image or picture can be projected.

It is a more specific object of the invention to provide a kaleidoscopic projection apparatus in which a masking device is utilized adjacent to and in conjunction with the film for producing the kaleidoscopic image to darken portions of the image.

Further objects and advantages will be apparent from the following description and the drawing appended thereto.

In the drawing, in which like reference characters refer to like parts:

Fig. 1 is a side, elevational view in section of one embodiment of the invention;

Fig. 2 is an enlarged view of a masking device that may be utilized in the invention;

Fig. 3 is a modified form of the masking device shown in Fig. 2;

2

Fig. 4 is a further modification of the masking device shown in Fig. 2;

Fig. 5 is a diagrammatic view illustrating one type of image that may be produced by a kaleidoscopic projection apparatus embodying the invention.

Fig. 6 is a diagrammatic view similar to that of Fig. 5;

Fig. 7 is a fragmentary view similar to that of Fig. 1 showing a modified form of the invention.

Illustrating the invention by the use of the masking device with a kaleidoscopic projector as shown in the drawings, the projection apparatus 10 comprises projector 11 and tubular housing 12. Interposed between the projector 11 and tubular housing 12 is film assembly 13 which includes a film providing the design or picture to be projected and the masking device.

The projector includes base 14 supporting lamp 15. Within the lamp and connected to socket 17 is a light source such as light bulb 16. Reflector 18 is positioned in back of the bulb to direct the light rays toward opening 19 of the lamp. Focusing cylinder 21 is frictionally secured within opening 19 in such a manner that it may be slid back and forth within the lamp. To collect the light from bulb 16, a lens 22 is provided within the focusing cylinder. The lens 22 may be a simple double convex lens having a relatively short focal length.

The tubular housing 12 is supported by base 23 in substantial alignment with the lamp 15 of the projector. The tubular housing contains elongated mirrors 24 which meet at one edge at an angle which is an even submultiple of 360°. The angle of the mirrors 24 is adjustable to produce any desired number of kaleidoscopic segments as is understood in the art. As shown, the mirrors meet at an angle of approximately 30° to produce twelve segments in the complete image, although any desired angle to produce any desired number of segments might be employed. Tubular housing 12 is of sufficient length to accommodate the elongated mirrors 24 and is open at both ends to permit the passage of light therethrough. Lens 27, which may be similar to lens 22, is secured within the housing to provide means for projecting the image on screen 28.

Film assembly 13 is interposed between the projector 11 and tubular housing 12. The film assembly comprises, in essence, a film suitable for providing the desired image and a masking device associated with the film for darkening at least a portion of the image at the desired intervals. As shown in Fig. 1, the film is provided by film disk 25 which is rotatably mounted adjacent the end of the housing to be driven by motor 26. The disk 25 may be formed with any desired pattern arrangement to produce any desired type of image either in black and white or in colors. A disk that has been found to be suitable for this purpose is made of a translucent photographic plate cemented to a sheet of clear glass to protect the emulsion of the plate. If desired, the film may be formed by painting or staining a sheet of clear glass with the desired design in either various shades of gray or colors.

To mask the film disk 25, a masking device 31 is positioned adjacent the disk. The masking device may comprise any opaque sheet material interposed between projector 11 and tubular housing 12 and having transparent portions of the desired shape therein. Thus, the masking disk may be formed of a metal sheet 32 having cutout portions 30 as shown in Fig. 2. In the embodiment illustrated in Fig. 1, the masking disk 32 is mounted in front of the opening 21 of the projector and is rotatably secured within frame 33. The masking disk 32 is adapted to be rotated by means of gear wheel 34 engaging rack 35 on the masking disk. The gear wheel 34, supported by bearing 37, is moved by stem 36. The position of the masking disk 32 with respect to the light opening 38 between the elongated mirrors 24 is shown in Fig. 2. As mounted, the masking disk may be rotated within frame 33 so that any desired portion of the disk is interposed between the light source and the tubular housing. In this way, the image provided by the film disk is darkened either partially or completely, depending upon the position of the masking disk as controlled by stem 36.

In using the mask as shown in Fig. 2, the masking disk may be turned to any desired masking position to obliterate a desired part of the image. As shown in Fig. 2, the opening 30 at the left has its outer edge concentric with the disk and its inner edge in the form of a spiral, so that the opening is relatively narrow at one end and becomes progressively wider at its opposite end. When the disk is turned to the position shown, it will be noted that the narrow end of the opening 30 registers with the mirrors adjacent the apex thereof to leave only a narrow opening and to block out rays tending to pass between the separated edges of the mirrors. With the mask in this position, the outer portion of the image will be darkened, as shown in Fig. 6, wherein the image or pattern occupies the central portion of the projected image as shown at 42 and the image is darkened around its periphery as indicated by the shaded portion 41. By turning the disk, the extent of blocking can be varied to vary the size of the darkened portion at the periphery of the image. If desired, the pattern could be turned to an extent to obliterate the entire image from the outside in, and by a reversal, to cause the image to reappear, starting at its center and increasing outward.

The opening in the disk at the right side as seen in Fig. 2, has its inner edge concentric with the disk and its outer edge formed on a spiral. By turning the disk to bring this opening into register with the ends of the mirrors, the portion adjacent the apex of the mirrors will be progressively blocked to an extent determined by the position of the masking disk. This will cause a darkening at the center of the image, as shown in Fig. 5, wherein the pattern is indicated at 42 with a darkened portion at its center indicated by the shaded part 41. By adjusting the masking disk to the desired extent, the size of the darkened area at the center of the pattern may be regulated.

One advantageous use of the invention is to provide darkened areas on the image on which additional images or pictures may be projected. For example, in design displays a darkened area may be produced at the center of the image, as indicated in Fig. 5, on which a separate picture or design display might be projected by a separate projection device. By turning the masking disk to the proper position the size of the darkened area can be made such as to receive any desired image or picture and can be caused to fade in and fade out at the beginning and ending of the design display. It will be understood that for this purpose the disk can be turned manually through the mechanism shown or could be synchronized with a separate projector to produce darkened areas on the image in synchronism with commencement and termination of the design display.

Fig. 3 illustrates an alternative masking disk construction in which parts corresponding to like parts in Fig. 2 have been indicated by the same reference numerals. The openings in the disk 32 of Fig. 3 are formed in substantially the same general outline as those in Fig. 2 but have their edges serrated or toothed. By forming the openings in the disk in this manner, various different designs of darkened area can be produced on the main image to provide unique and pleasing effects. It will further be seen that by turning this disk, various animated or moving changes can be provided in the obliteration or reinstatement of the image.

Fig. 4 illustrates still another construction in which two separate masking disks are provided which are separately rotatable and each of which is formed with a tapering curved opening. It will be seen that by turning these disks various combinations of effects can be produced to darken different areas of the image as desired. It will be understood that the openings in the disks can be shaped to produce substantially any desired effect and that instead of rotating the disks can be moved in some other manner to produce different masking effects.

Fig. 7 illustrates an alternative construction in which the masking disk 32 is driven continuously by a supplemental motor 43 to produce a cyclic change in the masking effect. With this construction the image may be progressively obliterated and reinstated either from the inside out or from the outside in, or both, as determined by the shape of the opening 30 in the disk. In any case, with a continuously driven disk, the image will cyclically darken and be re-established as the disk turns. If desired, the cyclic darkening of the image areas can be synchronized with a separate projecting device for design material or the like so that design displays will be projected on to the darkened areas of the image.

While several embodiments of the invention have been shown and described in detail, it will be understood that they are illustrative only and are not intended to be definitions of the scope of the invention, reference being had for this purpose to the appended claims.

I claim:

1. In a kaleidoscopic projection device having a light source, a pair of angularly arranged mirrors to receive light from said source and a movable film between the light source and mirrors for projecting movable kaleidoscopic images onto a screen, a movable opaque masking member interposed between the light source and the mirrors for masking the light passing through the movable film and provided with a tapered light transmitting portion to vary the passage of light to the mirrors for variably expanding and contracting the projected kaleidoscopic images upon movement of the masking member.

2. In a kaleidoscopic projection device having a light source, a pair of angularly arranged mirrors to receive light from said source and a movable film between the light source and mirrors for projecting movable kaleidoscopic images onto a screen, a movable opaque masking member interposed between the light source and the mirrors for masking the light passing through the movable film and provided with a tapered light transmitting portion tapered from the apex of the mirrors to vary the passage of light outwardly from the apex of the mirrors for variably expanding and contracting the outer margins of the projected kaleidoscopic images upon movement of the masking member.

3. In a kaleidoscopic projection device having a light source, a pair of angularly arranged mirrors to receive light from said source and a movable film between the light source and mirrors for projecting movable kaleidoscopic images onto a screen, a movable opaque masking member interposed between the light source and the mirrors for masking the light passing through the movable film and provided with a tapered light transmitting portion tapered toward the apex of the mirrors to vary the passage of light inwardly toward the apex of the mirrors for variably expanding and contracting the inner portion of the projected kaleidoscopic images upon movement of the masking member.

4. In a kaleidoscopic projection device for projecting movable kaleidoscopic images onto a screen, a light source, a pair of angularly arranged mirrors to receive light from said source, a film disc having kaleidoscopic patterns interposed between the light source and mirrors, means for rotating the film disc, an opaque masking disc interposed between the light source and the mirrors for masking the light passing through the film disc and provided with an arcuate tapered light transmitting portion to vary the passage of light to the mirrors for variably expanding and contracting the projected kaleidoscopic images, and means for rotating the masking disc.

WILLIAM C. EDDY.

REFERENCES CITED

The following references are of record in the file of this patent:

UNITED STATES PATENTS

| Number | Name | Date |
|---|---|---|
| 1,505,151 | Kunschman | Aug. 19, 1924 |
| 1,595,627 | Seymour | Aug. 10, 1926 |
| 1,990,867 | Harvey | Feb. 12, 1935 |
| 2,099,904 | Pennington et al. | Nov. 23, 1937 |

FOREIGN PATENTS

| Number | Country | Date |
|---|---|---|
| 411,350 | Germany | Mar. 26, 1925 |
| 434,763 | Germany | Sept. 29, 1926 |